United States Patent [19]

Krause et al.

[11] Patent Number: 5,759,329
[45] Date of Patent: Jun. 2, 1998

[54] FLUOROPOLYMER COMPOSITE TUBE AND METHOD OF PREPARATION

[75] Inventors: Edward Krause, Ann Arbor; Kenneth J. Kuenzel, Grass Lake; Frederick Woodward, Dexter, all of Mich.

[73] Assignee: Pilot Industries, Inc., Dexter, Mich.

[21] Appl. No.: 265,679

[22] Filed: Jun. 24, 1994

Related U.S. Application Data

[63] Continuation-in-part of Ser. No. 83,042, Jun. 24, 1993, abandoned, which is a continuation of Ser. No. 817,304, Jan. 6, 1992, abandoned.

[51] Int. Cl.$^6$ .................................................. B29C 47/06
[52] U.S. Cl. .............................. 156/244.13; 156/244.17; 156/244.23; 156/244.24; 156/272.6; 264/171.12
[58] Field of Search .......................... 156/242, 244.11, 156/244.17, 244.23, 244.24, 244.27, 272.6, 244.13; 264/22, 83, 469, 471, 173.16, 171.12; 204/169; 138/141, 121, 137

[56] References Cited

U.S. PATENT DOCUMENTS

| 3,017,339 | 1/1962 | Dewey ................................. 204/169 |
| 3,133,854 | 5/1964 | Simms ................................ 156/272.6 |
| 3,352,714 | 11/1967 | Anderson et al. |

(List continued on next page.)

FOREIGN PATENT DOCUMENTS

| 686119 | 5/1964 | Canada . |
| 0185590 | 6/1986 | European Pat. Off. . |
| 0385731 | 9/1990 | European Pat. Off. . |
| 479592 | 4/1992 | European Pat. Off. . |
| 1290717 | 3/1969 | Germany . |
| 3524631 | 1/1986 | Germany . |
| 3930350 | 3/1991 | Germany . |
| 51-119777 | 10/1976 | Japan . |
| 53-58588 | 5/1978 | Japan . |
| 5733373 | 6/1979 | Japan . |
| 5738272 | 6/1979 | Japan . |
| 58-114979 | 8/1983 | Japan . |
| 58-201613 | 11/1983 | Japan . |
| 63-9533 | 2/1988 | Japan . |
| 1154755 | 6/1989 | Japan . |
| 1174442 | 7/1989 | Japan . |
| 2107371 | 4/1990 | Japan . |
| 3114829 | 5/1991 | Japan . |
| 2204932 | 11/1988 | United Kingdom . |

OTHER PUBLICATIONS

Cefral Soft, Technical Data, Central Glass Co., Ltd.
Plasma–Sprayed Coatings, Herbert Herman, Scientific American, Sep. 1988, pp. 112–117.
Achieving Optimum Bond Strength With Plasma Treatment, George P. Hansen et al., Society of Manufacturing Engineers, Sep. 1989, Paper No. AD 89–537.

(List continued on next page.)

*Primary Examiner*—Richard Crispino
*Attorney, Agent, or Firm*—Gifford, Krass, Groh, Sprinkle, Patmore, Anderson & Citkowski,P.C.

[57] ABSTRACT

Described herein is a method of preparing a fluoropolymer composite tube comprising the steps of forming a fluoropolymer substrate, and thereafter layering and chemically bonding the fluoropolymer with a polymer layer, preferably a thermosetting or thermoplastic elastomer. The fluoropolymer substrate can be activated by subjecting the substrate to a charged gaseous atmosphere formed by electrically ionizing a gas which contacts the substrate. Thereafter, a layer of a thermosetting or thermplastic elastomer is applied to the activated fluoropolymer substrate resulting in a stronger chemical bond. The ionizing step can be described as a mixed gas plasma discharge or an electrically formed plasma. The thermosetting elastomer can, but does not have to contain a curing agent. In particular, this invention describes a fuel pipe comprised of an inner fluorocarbon layer having electrostatic discharge resistance and hydrocarbon evaporative emission resistance, and on top of and integral with the fluorocarbon layer, an outer layer of a thermosetting or thermoplastic elastomer chemically bonded to the fluorocarbon layer. Fluoropolymer layers have excellent chemical resistance.

10 Claims, 5 Drawing Sheets

U.S. PATENT DOCUMENTS

| | | | |
|---|---|---|---|
| 3,455,774 | 7/1969 | Lindsey et al. | 156/272.6 |
| 3,457,139 | 7/1969 | James | 156/272.6 |
| 3,473,087 | 10/1969 | Slade . | |
| 3,507,763 | 4/1970 | McBride | 204/169 |
| 3,676,181 | 7/1972 | Kowalewski . | |
| 3,907,955 | 9/1975 | Viennot | 264/105 |
| 4,035,534 | 7/1977 | Nyberg . | |
| 4,188,426 | 2/1980 | Auerbach | 204/169 |
| 4,272,585 | 6/1981 | Strassel . | |
| 4,293,663 | 10/1981 | Stivers . | |
| 4,330,017 | 5/1982 | Satoh et al. | 138/141 |
| 4,343,861 | 8/1982 | Stivers . | |
| 4,353,763 | 10/1982 | Simons . | |
| 4,358,559 | 11/1982 | Holcomb et al. . | |
| 4,383,131 | 5/1983 | Clabburn . | |
| 4,564,662 | 1/1986 | Albin . | |
| 4,603,712 | 8/1986 | Krause | 138/141 |
| 4,634,615 | 1/1987 | Versteegh et al. | 138/141 |
| 4,636,272 | 1/1987 | Riggs . | |
| 4,654,235 | 3/1987 | Effenberger et al. . | |
| 4,718,568 | 1/1988 | Dal Palu . | |
| 4,731,156 | 3/1988 | Montmarquet . | |
| 4,743,327 | 5/1988 | Dehaan et al. . | |
| 4,748,204 | 5/1988 | Kawashima et al. . | |
| 4,749,610 | 6/1988 | Katsuragawa et al. . | |
| 4,758,455 | 7/1988 | Campbell et al. . | |
| 4,770,927 | 9/1988 | Effenberger et al. . | |
| 4,800,109 | 1/1989 | Washizu . | |
| 4,826,731 | 5/1989 | Wagner et al. . | |
| 4,887,647 | 12/1989 | Igarashi et al. . | |
| 4,898,638 | 2/1990 | Lugez . | |
| 4,933,060 | 6/1990 | Prohaska et al. . | |
| 4,943,473 | 7/1990 | Sahatjian et al. . | |
| 4,995,028 | 2/1991 | Boling et al. . | |
| 5,008,340 | 4/1991 | Guerra et al. . | |
| 5,051,978 | 9/1991 | Mayer et al. . | |
| 5,056,512 | 10/1991 | Bower et al. . | |
| 5,059,480 | 10/1991 | Guerra et al. . | |
| 5,077,115 | 12/1991 | Arthur et al. . | |
| 5,081,326 | 1/1992 | Usui . | |
| 5,089,200 | 2/1992 | Chapman et al. . | |
| 5,108,780 | 4/1992 | Pitt et al. | 156/272.6 |
| 5,124,878 | 6/1992 | Martucci | 138/125 |
| 5,141,800 | 8/1992 | Effenberger et al. . | |
| 5,170,011 | 12/1992 | Martucci . | |
| 5,284,184 | 2/1994 | Noone et al. . | |
| 5,357,005 | 10/1994 | Buchwalter et al. | 156/272.6 |
| 5,500,257 | 3/1996 | Krause et al. | 427/487 |
| 5,554,425 | 9/1996 | Krause et al. | 428/36.91 |

OTHER PUBLICATIONS

Properties of Polymers Used in Hose Manufacture, Chapter 16, Hose Technology, Colin W. Evans, Publisher: Applied Science Publisher Ltd., Ripple Rd, Barking, Essex, Eng.

Ceramic Coatings: More Than Just Wear Resistant, Edward S. Hamel, ME, Aug. 1986, pp. 30–34.

Gas Plasma Technology and Its Applications, Stephen L. Kaplan and Robert Hollan, Mar. 1987, Plasma Science, Belment, Calif.

Plasma Treatment Upgrades Adhesion in Plastic Parts, Stephen L. Kaplan and Peter W. Rose, Plastics Engineering, May 1988, pp. 77–79.

Dyne-A-Mite™ Solves Adhesion Problems, Promotional brochure from Enercon Industries Corporation, Menomee Falls, Wisconsin.

"Pilot Industries Wins Top Plunkett Award," Plastics News, Wilmington, Delaware, 5 Apr. 1993, p. 8.

"'P-Cap' from Pilot Industries Inc. First Place Winner 1993 Plunkett Awards for Innovation with 'Teflon'."Du Pont Background, Du Pont External Affairs, Wilmington, Delaware.

"Du Pont Announces Winners of 1993 Plunkett Awards for Innovation with 'Teflon'," Du Pont External Affairs, Wilmington, Delaware, Mar. 1993.

"Pilot Industries Wins Top Award for Innovation," Pilot Industries, Inc., Dexter, Michigan.

Derwent Abstract of JP 62-162542.

Derwent Abstract of JP 63-224943.

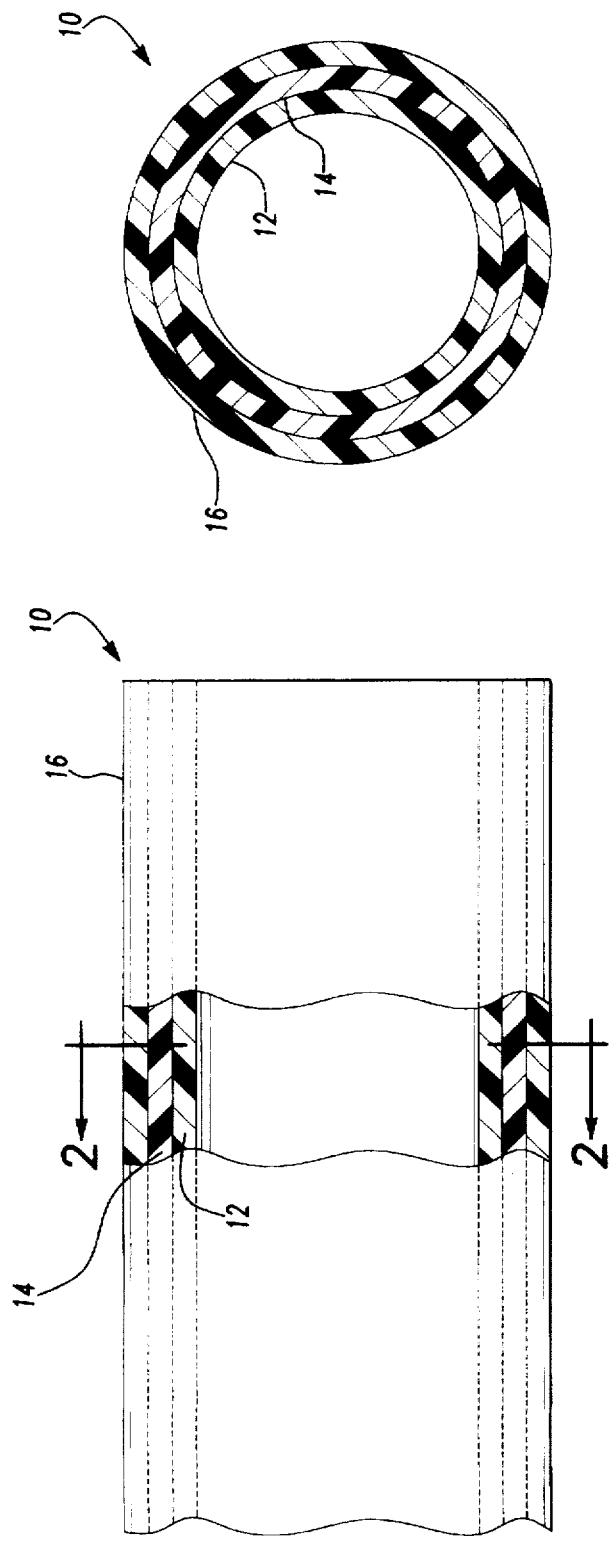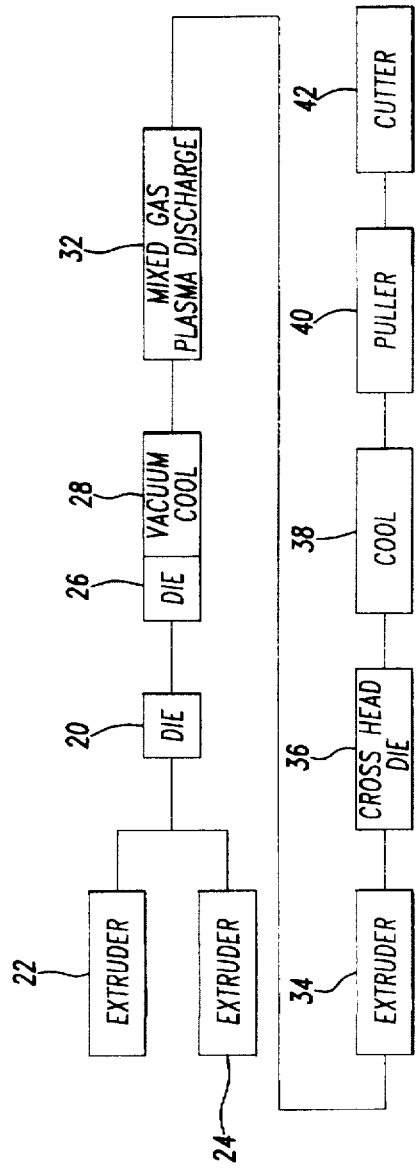

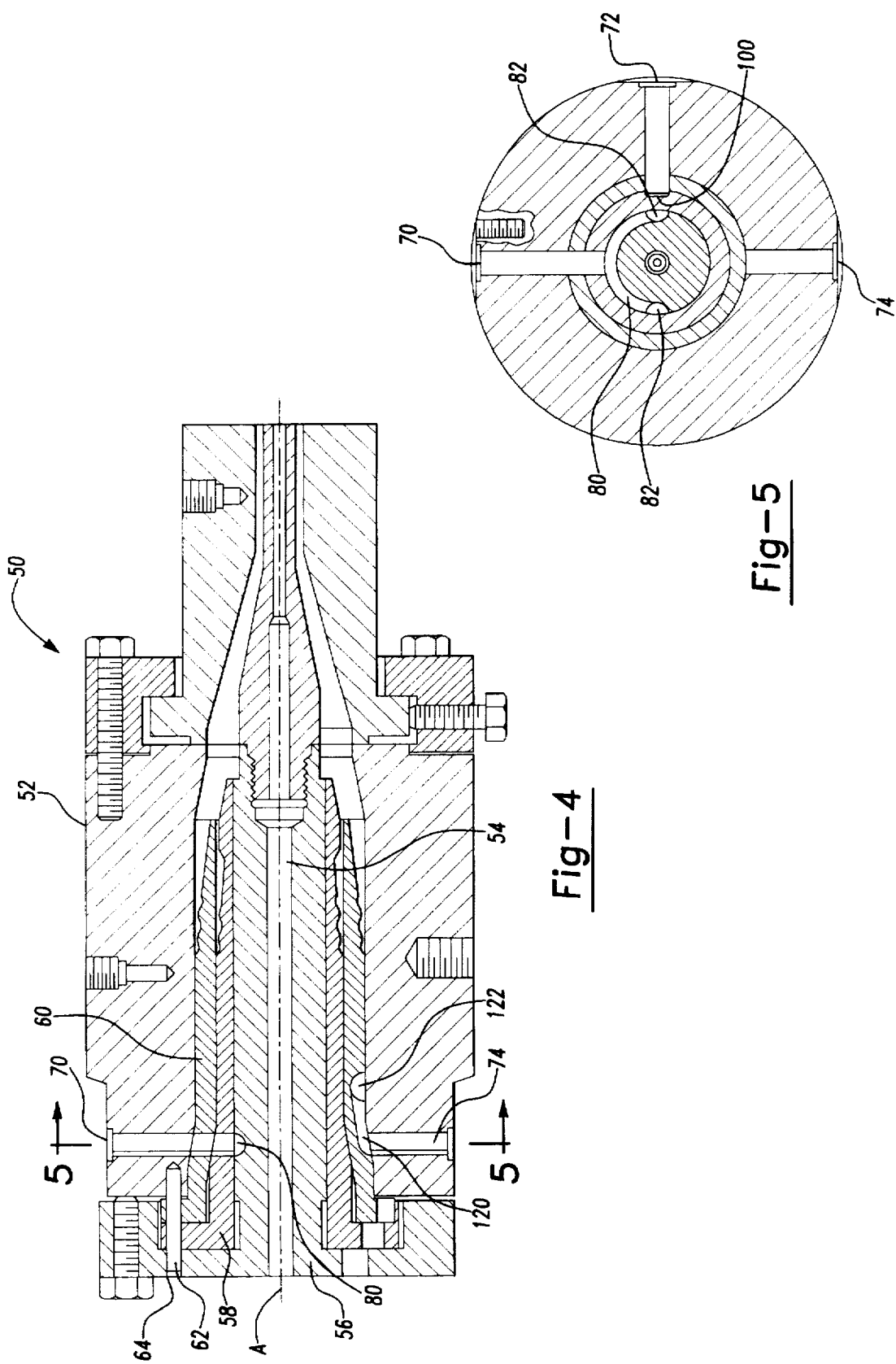

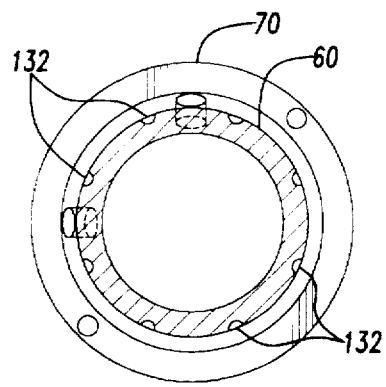
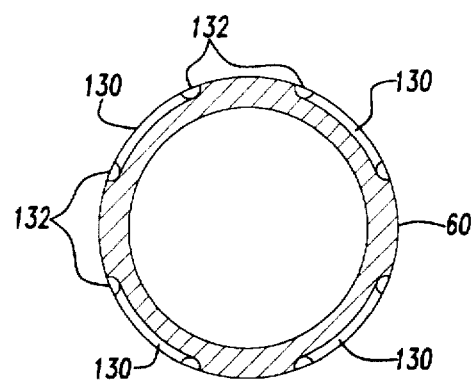
Fig-17    Fig-18
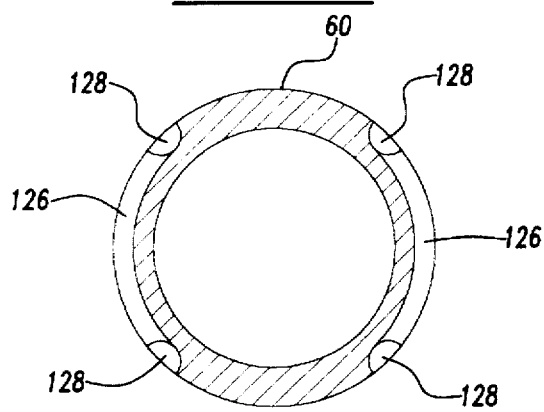
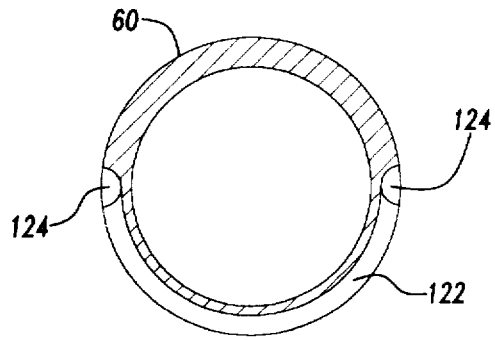
Fig-19    Fig-20
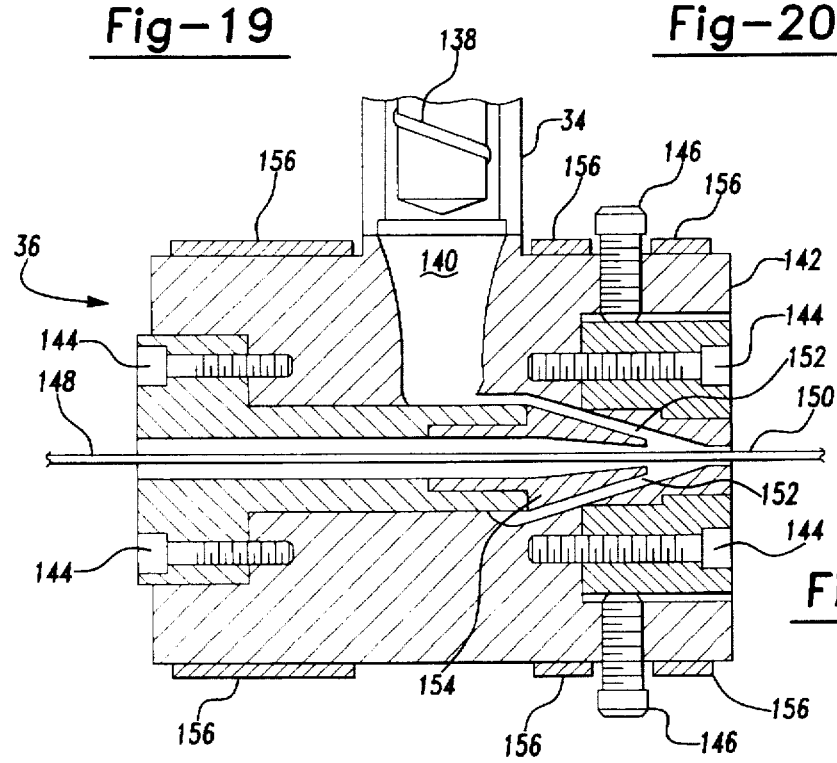
Fig-21

FLUOROPOLYMER COMPOSITE TUBE AND METHOD OF PREPARATION

CROSS REFERENCE TO RELATED APPLICATIONS

This is a continuation-in-part of Ser. No. 08/083,042 filed on Jun. 24, 1993, now abandoned, which was a continuation of Ser. No. 07/817,304 filed on Jan. 6, 1992, now abandoned.

BACKGROUND OF THE INVENTION

1. Field of the Invention

The invention pertains to the field of fluoropolymer hoses and tubes such as fluoropolymer composite pipes such as those used in fuel lines.

2. Description of the Prior Art

With the advent of increased concern over evaporative fuel emissions standards, there has been an increasing need for fuel lines that meet increased evaporative emission requirements while at the same time having high chemical and electrostatic discharge resistance. Further, in order to be economical, any fuel line must be able to be produced in large quantities at a low cost. A desired fuel line likewise should have appropriate physical properties including but not limited to sufficient tensile strength and kink resistance, or the ability of the fuel line to retain a particular shape upon bending.

Fuel line hoses of a variety of materials have been suggested over the years. Tetrafluoroethylene has been utilized and has excellent and outstanding high temperature and chemical resistance. "Hose Technology," publisher: Applied Science Publisher, Ltd., Essex England, by: Colin W. Evans, pages 195–211. Nylon has also been utilized as a hose composition. However, fluorinated polymers are difficult to use because it is difficult to adhere other materials to them in order to form desirable composites.

U.S. Pat. No. 4,933,060 discloses surface modification of fluoropolymers by reactive gas plasma. The reference, however, further indicates that in order to have sufficient bonding, adhesives must be utilized prior to the application of an additional layer. Suitable adhesives are epoxies, acrylates, urethanes, and the like.

U.S. Pat. No. 4,898,638 teaches a method of manufacturing flexible gaskets which withstand chemical agents. Flexible gaskets are prepared in which one film of PTFE (polytetrafluoroethylene) is directly applied onto a sheet of raw rubber and the sheet of rubber together with the film of PTFE is subjected to heating and pressure suitable for causing the rubber to vulcanize. Use of adhesives in the bonding of fluoropolymers is likewise described in U.S. Pat. No. 4,743,327, and their use is required to make the development operative. Activating fluoropolymers utilizing ammonia gas is taught in U.S. Pat. No. 4,731,156.

None of the prior art describes a fluoropolymer with a layer of a thermosetting or thermoplastic polymer, preferably an elastomer, that is integral with and chemically bonded to the fluoropolymer, which when combined in a multi-layered composite hose or pipe, has desirable electrostatic discharge resistance, hydrocarbon evaporative emission resistance, and flexibility. Further, the prior art suggests the need for adhesives to firmly and fixedly join plastic layers. This invention does not have as an essential requirement that additional adhesives are needed in joining the fluoropolymer layer to the thermosetting or thermoplastic elastomer because there exists a chemical bond between the fluoropolymer and the thermosetting or thermoplastic polymer layers.

Polymer surfaces typically lack the irregular structure necessary to achieve an effective mechanical bond. Therefore, methods such as etching or scuffing have been used to physically "roughen" the substrate surface. This invention however, by incorporating a chemical bond, does not require this mechanical alteration of the surface. It can be shown through various microscopic techniques (i.e. SEM) that no significant changes occur to the physical structure of the substrate surface by exposure to the charged gaseous atmosphere utilized in this invention. Furthermore, bonding has been achieved by this method with materials such as thermoset elastomers which typically do not have processing viscosities sufficiently low to achieve adequate bond strength strictly by mechanical means.

It is an object of the present invention to have a fuel pipe or tube that has a fluoropolymer substrate that can be activated sufficiently to be able to have an integral and chemically bonded top coat or layer of a thermosetting or thermoplastic elastomer.

It is also an object of the present invention to prepare a fluoropolymer composite by extruding a multi-layered fluoropolymer substrate, one layer of which has desirable chemical, permeation, and electrostatic discharge resistance, and on top of the fluoropolymer layers would be an extruded thermosetting or thermoplastic elastomer layer.

SUMMARY OF THE PRESENT INVENTION

The present invention is concerned with a method of preparing a fluoropolymer composite tube comprising the steps of:

(1) forming a fluoropolymer substrate;
(2) and thereafter layering the fluoropolymer with a polymer selected from the group consisting of thermosetting elastomers and thermoplastic elastomers such that there exists a chemical bond between the layers.

The fluoropolymer substrate can be activated by subjecting the substrate to a charged gaseous atmosphere formed by electrically ionizing a gas which contacts the substrate. Also, the thermosetting elastomer can contain a curing agent. Both the activation of the fluoropolymer by a charged gaseous atmosphere and the addition of a curing agent to the thermosetting elastomer serve to increase the strength of the chemical bond between the layers. Although both the activation step and some curing agents can increase the chemical adhesion between the fluoropolymer and thermosetting elastomer layers, they are not necessary in all cases to effect the chemical adhesion.

The invention is also concerned with a fuel pipe comprised of an inner fluorocarbon layer having electrostatic discharge resistance and hydrocarbon evaporative emission resistance, and on top of and integral with the fluorocarbon layer is an outer layer of a thermosetting or thermoplastic elastomer chemically bonded to the fluorocarbon layer.

BRIEF DESCRIPTION OF THE DRAWINGS

A better understanding of the present invention will be had upon reference to the following detailed description, when read in conjunction with the accompanying drawings, wherein like reference characters refer to like parts throughout the several views, and in which:

FIG. 1 is a side sectional view of the three-layered fuel pipe of the present invention;

FIG. 2 is a cross-sectional view of FIG. 1 along lines 2—2;

FIG. 3 is a schematic diagram of the process for the method of preparing the fuel pipe of the present invention;

FIG. 4 is a cross-sectional view of the multi-inlet extrusion die used in the method of preparing the fuel pipe of the present invention;

FIG. 5 is a cross-sectional view taken along the lines 5—5 of FIG. 4;

FIG. 17 is a cross-sectional view taken along the lines 17—17 of FIG. 16;

FIG. 18 is a cross-sectional view taken along the lines 18—18 of FIG. 16;

FIG. 19 is a cross-sectional view taken along the lines 19—19 of FIG. 16;

FIG. 20 is a cross-sectional view taken along the lines 20—20 of FIG. 16; and

FIG. 21 is a cross-sectional view of the cross-head die as schematically shown in FIG. 3.

DETAILED DESCRIPTION OF PREFERRED EMBODIMENTS OF THE PRESENT INVENTION

Figure 6:
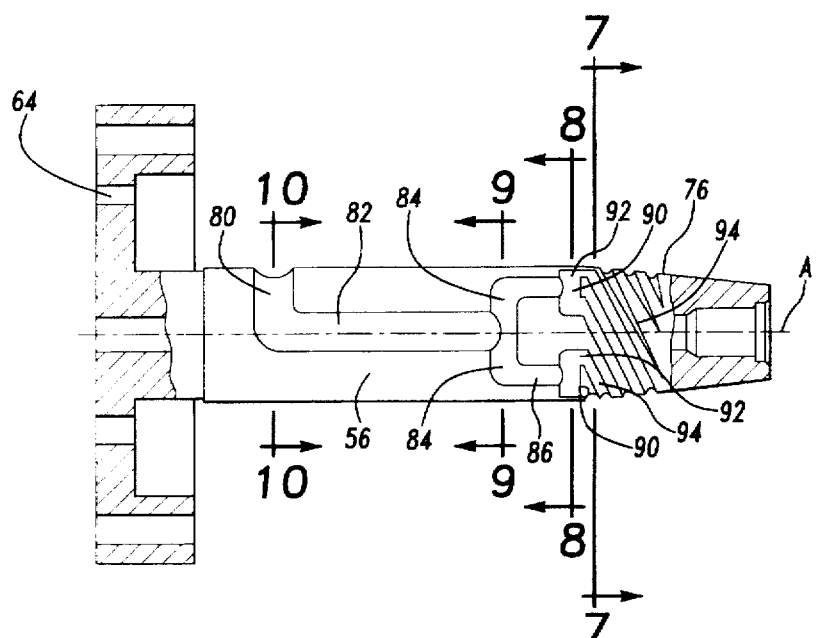
FIG. 6 is a cross-sectional view of the interior of the multi-inlet extrusion die taken along the lines 6—6 of FIG. 7.
Figure 7:
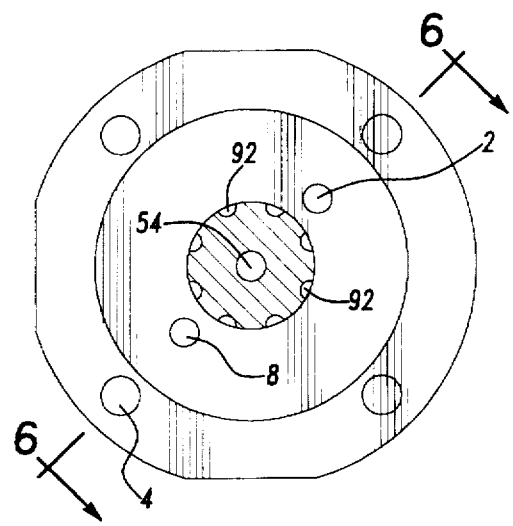
FIG. 7 is a cross-sectional view taken along the lines of 7—7 of FIG. 6.

The present invention is concerned with a method of preparing a fluoropolymer composite such as a pipe or tube. In particular, it is preferred that the fluoropolymer be a multi-layered fluoropolymer.

It is preferred that the inner fluoropolymer layer have electrostatic discharge resistance and the entire fluoropolymer layer have hydrocarbon evaporative emission resistance. The electrostatic discharge resistance is obtained preferably by making the fluoropolymer layer a conductive fluoropolymer. In this fashion, the electrostatic charge (electricity) that may be generated during the flow of fuel or other fluids through the pipe or tube can be carried to ground.

The polymers, e.g. fluoropolymers, that may be utilized are any of the available fluoropolymers, many of which are commercially available. Suitable fluoropolymers include, but are not limited to, ethylene-tetrafluoroethylene (ETFE), ethylene-chlorotrifluoroethylene (ECTFE), fluorinated ethylenepropylene (FEP), perfluoroalkoxy (PFA), polyvinylfluoride (PVF), polyvinylidene fluoride (PVDF), tetrafluoroethylene-hexafluoropropylene-vinylidenefluoride (THV), polychlorotrifluoroethylene (PCTFE), polytetrafluoroethylene (PTFE). Other fluoropolymers are those that are prepared from perfluorinated α-fluoroolefin monomers containing hydrogen atoms as well as fluorine atoms. The α-fluoroolefin has 2–6 carbon atoms. Typical α-fluoroolefins may be perfluorinated as hexafluoropropene, perfluorobutene, perfluoroisobutene, and the like; as hydrogen-containing α-fluoroolefins such as trifluoroethylene, vinylidene fluoride, vinyl fluoride, pentafluoropropane, and the like; as halogencontaining α-fluoroolefins such as trifluorochloroethylene, 1,1-difluoro-2,2 dichloroethylene, 1,2-difluoro-1,2 dichloroethylene, trifluorobromoethylene and the like; and as perfluoroalkoxyethylene polymers. The most preferred fluoropolymer is ETFE sold under the trademark Tefzel® (trademark of DuPont).

The layer of fluoropolymer that is to be conductive in order to carry away the electrostatic discharge can generally be made conductive in a well known manner. This conductivity can occur by adding conductive particles to the fluoropolymer resin prior to processing. The electrically conductive particles incorporated into fluoropolymers are described in U.S. Pat. No. 3,473,087, hereby incorporated by reference. Suitable conducting materials would be carbon black in the amount of 0.1–10 weight percent of the total fluoropolymer layer, preferably 0.1–2 weight percent. The carbon black is blended with the fluoropolymer prior to the extrusion step. Conductive fluoropolymer resin is likewise commercially available.

It is preferred that the fluorinated polymer be extruded by a melt extrusion technique where the first layer would be a conductive fluoropolymer and co-extruded with it would be the second layer on top of the first layer, wherein the second layer is a fluoropolymer without the conducting particles therein.

On top of the fluoropolymer layer, integral with it, and chemically bonded to the fluoropolymer layer is an extruded thermosetting or thermoplastic elastomer material. The thermosetting elastomer material can be a variety of materials. Suitable materials would be those that can be extruded on top of the extruded fluoropolymer pipe or tube including, but not limited to, amide urethane elastomers, chlorinated polyethylene, chloroprene, chlorosulfonated polyethylene, copolyether ester, epichlorohydrin, ethylene acrylic, ethylene propylene, fluoroelastomer, perfluoroelastomer, fluorosilicone, hydrocarbon elastomers, hydrogenated nitrile butyl, isobutylene isoprene, isoprene, nitrile, polyacrylate, polybutadiene, polyester urethane, polyether urethane, polynorborene, polysulfide, polyurethanes, propylene oxide, silicone, styrene butadiene, styrenic elastomer, and thermoplastic elastomers. The most preferred thermosetting elastomer is VAMAC® ethylene/acrylic elastomer (trademark of DuPont), a copolymer of ethylene and methyl acrylate plus a cure site monomer.

Cross-linking and adhesion of the layers can occur through a number of extrusion techniques. The preferred method utilizes an autoclave amine cure system, with temperature and pressure at 320° F. and 80 PSI, respectively. Another method utilizes a continuous autoclave and salt bath with temperature and pressure at 400°–500° F. and 1 atm, respectively. Still other methods can also be used.

The end product that is produced is the multi-layered fluoropolymer having a thermosetting or thermoplastic elastomer material 16 chemically bonded on top 10 as shown in FIGS. 1 and 2. The conductive layer 12 is co-extruded with the non-conductive layer 14. The conductive particles (not shown) are present in the layer 12.

When conductivity in the fluoropolymer layer is not desired, then the same non-conductive fluoropolymer is co-extruded to form the multiple layers. Obviously, one may desire only one fluoropolymer layer, in which case, a single extrusion die could be used. Thereafter, the additional processing steps are followed.

Additionally, a braided reinforcing material can be placed between the layers to provide added strength to the tube. This reinforcing material may be layered in between the fluoropolymer layer and the thermosetting or thermoplastic elastomer layer, or in a preferred embodiment, may be layered on top of the composite tube, with an added layer of the thermosetting or thermoplastic elastomer on top.

Prior to the extruding of the top thermosetting or thermoplastic elastomer layer 10, the fluoropolymer can be activated. In other words, the outer portion of layer 14 which is to come into contact with the layer 10 may have its surface activated by plasma discharge or corona discharge. This means that the fluoropolymer layer 14 subjected to a charged gaseous atmosphere that is formed by electrically ionizing a gas which contacts the substrate 14. This serves to increase the chemical bond between the layers. It is most preferred that the plasma impinge upon 360° of the fluoropolymer tube. In other words, there is a first stage mixed gas plasma electrode discharge where approximately 270° of the tube is subjected to the mixed gas plasma discharge. The tube is anywhere from about 0.05 to 3 inches, preferably 0.1 to 0.5 inches from the electrode as the tube passes through the mixed gas plasma electrode discharge. Thereafter, within approximately 3 inches to 3 feet, preferably 6 inches to 18 inches from the first mixed gas plasma discharge device, the tube comes in contact with a second stage mixed gas plasma discharge placed on the opposite side from the first side, where again the tube is subjected to approximately a 270° contact around the tube with the mixed gas plasma discharge. In this fashion, the entire circumference of 360° of the tube is subjected to activation by mixed gas plasma discharge.

Any conventional mixed gas plasma discharge equipment can be used. One such device is available from Enercon Dyne-A-Mite, Model B12, which uses an air blown electrical arc to form the mixed gas treatment plasma. In other words, there are four separate mixed gas plasma discharge heads making up four separate stages which are in the open air, at ambient temperature and pressure. Each mixed gas plasma discharge head of the Enercon device, each trapezoidal in shape, has a pair of wire electrodes (0.065 inches diameter) in the same horizontal plane separated by a gap of 0.35 inches with an overall length from the end of one wire electrode to the end of the second wire electrode of 1.9 inches.

It is to be appreciated that the open air and open atmosphere is the most preferred economical approach for mixed gas plasma discharge. It is to be appreciated further that depending upon the amount of activation that is required and the particular materials that are to be applied to the fluoropolymer, closed chamber electrode discharge devices could be utilized. In a closed chamber environment, a pair of oppositely charged (positive and negative electrodes) may be utilized by passing a current therebetween, thereby ionizing a gas. The substrate can pass through the electric field which has ionized the gas. This gas may be altered by supplying additional gases to the chamber such as oxygen, nitrogen or other reactive gases such as carbon monoxide, fluorinated gases, carbon dioxide, hydrogen fluoride, carbon tetrafluoride, ammonia, and the like. The chamber may be operated at vacuum pressure such as from 0.01 to 100 torr (1 atmosphere equals 760 torr).

A coextrusion die (FIG. 21) is used for high production rates. Therefore, the extruded tube as it passes through the mixed gas plasma discharge stage moves at a high constant rate. Preferably, the rate is from 1 to 150 linear feet per minute (FPM), preferably 15 to 60 FPM. The Enercon device has a treatment area for the mixed gas plasma discharge with a size of about 2½ inches by 2 inches per head.

When the Enercon Dyne-A-Mite mixed gas plasma discharge device is utilized, the activated tube is not significantly hot to the touch, but is perhaps 10° or 20 ° F. over ambient temperature. This increases the safety in manufacturing the fuel tube or pipe.

After the activation of the fluorinated tube, if activation is utilized, the thermosetting or thermoplastic elastomer is extruded through the cross-head die as shown in FIG. 21 and schematically in FIG. 3. If the thermosetting elastomer material does not already contain a curing agent, then a curing agent may be added prior to layering on top of the fluoropolymer. Just as with the activation step, the addition of the curing agent serves to increase the strength of the chemical bond between the layers. The cross-head die is at an extrusion temperature sufficient to soften the thermosetting elastomer material. Generally, the temperature is significantly less than the extrusion temperature of the fluorinated plastic. The operative temperature for the cross-head die would range from about 100° to about 500° F., preferably 120° to about 200° F., with screw rotations per minute (RPM) of 10 to 100 RPM, preferably 20 to 60 RPM, with a line speed of approximately 5 to 100 feet per minute, preferably 15 to 70 feet per minute.

The Enercon device is preferably operated at an output of 15,000 volts with 30 milliamps plasma per electrode with 2 electrode stages being employed.

The wattage that is applied to the electrodes in order to ionize the gas can vary substantially. For example, the wattage may vary from 250 joules/sec to 600 joules/sec when the tube being treated is moving about 25 sq. inches/min. (assuming 1 inch outer diameter tube, 12 inches long), i.e. about 10 to 24 joules per linear foot of tube.

By exposing many of the fluoropolymer substrates to a charged gaseous atmosphere, various functional groups such as carbonyl, carboxyl, hydroxyl groups and others may be inserted into the molecular structure of the substrate surface. These groups can provide sites for potential chemical bonding with other materials by way of secondary interactions such as hydrogen bonding, van der Waal's interactions, and others. These interactions may occur between the substrate and groups present in the molecular make-up of the applied polymer layer, or between the substrate and additives contained within the applied polymer layer (such as curing agents). These interactions achieve a chemical bond between the substrate and second layer. For example, many thermosetting materials such as ethylene-acrylic elastomer (VAMAC®) may utilize amine curing agents such as triethylene tetramine, which, along with ethylene-acrylic elastomer (VAMAC®) are capable of forming hydrogen bonds with the activated substrate surface. Other substitutes such as nylons and urethanes already have functional groups present in their molecular structure such that activation of the substrate is unnecessary in order to effect this chemical bonding with the applied polymer layer.

There may also exist the possibility to form covalent chemical bonds to the activated substrate surface. Curing agents such as amines react with carboxyl curing sites of a neat polymer matrix to form amide crosslinks. Similarly, curing agents present at the interface may react with chemical groups in the substrate surface forming covalent bonds to the substrate. These linkages may further react to the applied thermoset/polymer layer.

Turning now to a description of the drawings. FIG. 1 is a side sectional view of a three-layered fuel pipe. A two-layered pipe may also be utilized in which there is a single, rather than double, fluoropolymer layer. FIG. 2 is a cross-sectional view of a three-layered pipe. Again, a two-layered pipe may also be utilized. The schematic diagram of FIG. 3 indicates that coextrusion takes place in the coextrusion die 20 from extruders 22 and 24. After the formed tube leaves die 20, it then enters into die 26 which is in the entrance-way to the vacuum water-cooled chamber 28. The temperature of the water is room temperature. The tube may then be exposed to the mixed gas plasma discharge 32 schematically show in FIG. 3. Thereafter, the activated fluoropolymer substrate is subjected to an extrusion of a thermosetting elastomer from extruder 34. The fluoropolymer inner layer passes through a cross-head die for sizing at reference numeral 36. Thereafter the composite tube is cooled by vacuum cooler 38. The tube is pulled axially through the vacuum cooler by puller 40 and thereafter is cut by cutter 42 to the desired size.

The operation of the die will now be described. While FIG. 4 shows three inlet lines, it is most preferred that a two inlet coextrusion die be utilized when two coextruded layers of fluorinated polymers are prepared, one being the conductive layer and the other being a non-conductive layer. Obviously, if only a single layer of fluoropolymer is used, a commercially available tube-forming extrusion die can be used.

The die assembly 50 shown in FIG. 4 includes a die housing 52 having an inner die member 56, a center die member 58 and an outer die member 60 as the main structural members. The die members 56, 58 and 60 are concentric and generally cylindrically-shaped extrusion die members. Throughbore 54 extends along axis "A" of the die assembly 50. The die members 56, 58 and 60 are held together by a bolt or pin 62 or the like which extends through the orifice 64.

With additional reference to FIG. 5, in the preferred embodiment, the extrusion die members 56, 58 and 60 have inlets 70, 72 and 74, respectively, extending inwardly from the outer periphery of the die housing 50 to the associated die member. As best shown in FIG. 5, the inlet 70 preferably extends to a semi-circumferential distribution channel 80, through which extrusion material is passed for distribution to the extrusion end 76 of the die assembly 50, as described in greater detail herein below.

Figures 8, 9, 10:
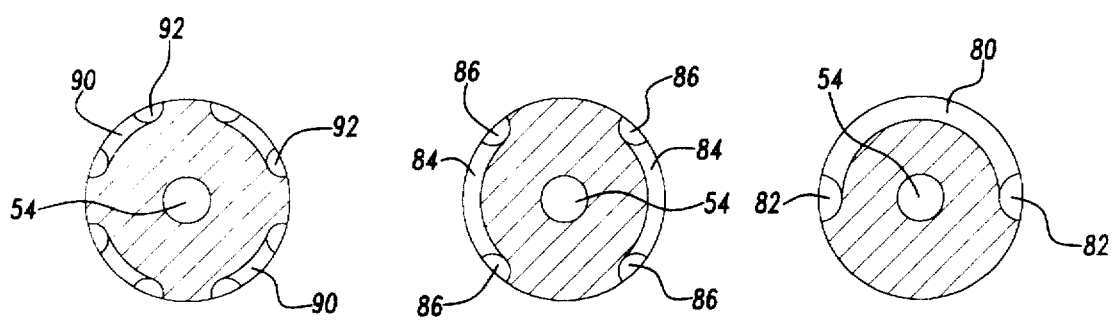
FIG. 8 is a cross-sectional view taken along the lines 8—8 of FIG. 6.
FIG. 9 is a cross-sectional view taken along the lines 9—9 of FIG. 6.
FIG. 10 is a cross-sectional view taken along the lines 10—10 of FIG. 6.

As best shown in FIG. 10, the distribution channel 80 is in fluid communication with a pair of axial distribution channels 82. As illustrated, the axial distribution channels 82 are preferably disposed symmetrically around the inner die member 56 and extend therealong toward the extrusion end 76.

Referring now to FIG. 6 and FIG. 9, there is shown cross-sections of the inner die member 56. Each axial distribution channel 82 is in fluid communication with a pair of branch distribution channels 84. As illustrated, the branch distribution channels 84 extend around the inner die member 56 in a generally semi-circumferential manner. The branch distribution channels 84 are in fluid communication with four (4) axial distribution channels 86.

With reference to FIG. 6, the axial distribution channels 86 extend along axis "A" of the inner die member 56 toward the extrusion end 76. The channels 86 are in fluid communication with a plurality of branch distribution channels 90, which extend around the inner die member 56 in a partial circumferential manner, as best shown in FIG. 8. In the preferred embodiment, the distribution channels 90 are in fluid communication with eight (8) axial distribution channels 92 (only four of which are specifically illustrated in FIG. 6), which also extend along axis "A" toward the extrusion end 76. As shown in FIG. 6, the axial distribution channels 92 are in fluid communication with a plurality of generally screw-shaped channels 94 disposed around the extrusion end 76 in a spiral manner.

Thus, extrusion material enters the inlet 70 and travels to the inner die member 56. At semi-circumferential distribution channel 80, the extrusion material splits and enters the axial distribution channels 82. The material travels along the channels 82 and splits again at the branch distribution channels 84. The extrusion material then enters the axial distribution channels 86 and travels therealong to the branch distribution channels 90, where the material splits again and enters the eight axial distribution channels 92. From the channels 92, the extrusion material enters the screw-shaped channels 94. These screw-shaped channels 94 function to provide even distribution and good uniformity of the extrusion material during the extrusion process.

Figure 11:
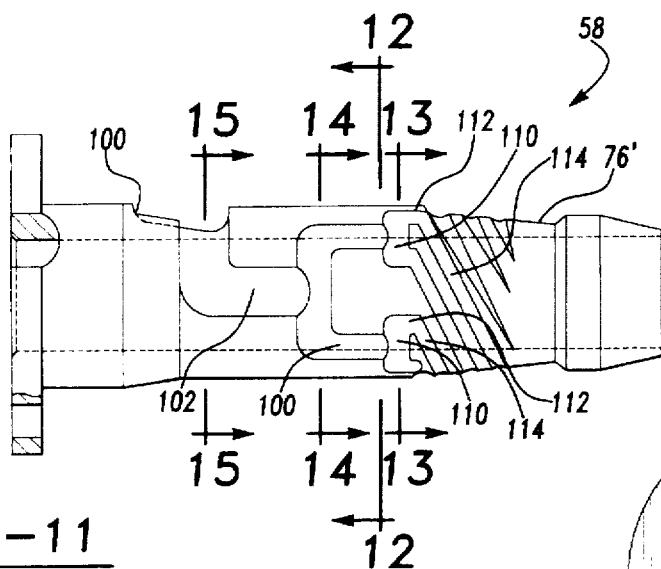
FIG. 11 is a cross-sectional view of the center extrusion die that is a part of the multi-inlet extrusion die of FIG. 4.
Figure 12:
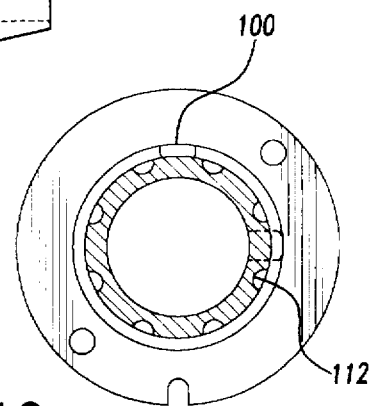
FIG. 12 is a cross-sectional view taken along the lines 12—12 of FIG. 11.
Figure 15:
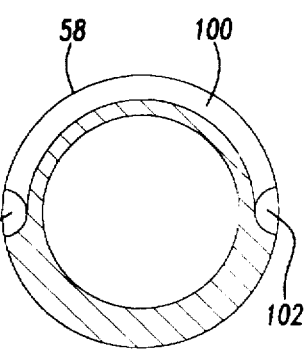
FIG. 15 is a cross-sectional view taken along the lines 15—15 of FIG. 11.

Referring now to FIGS. 11 and 15, there are shown various cross-sections of the center die member 58. Extrusion material enters the center die member 58 through the inlet 72 (as best shown in FIG. 1). The inlet 72 preferably extends to a semi-circumferential distribution channel 100, through which extrusion material is passed for distribution to the extrusion end 76', as described in greater detail herein below.

Figure 14:
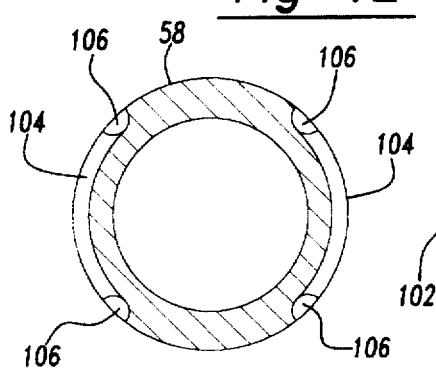
FIG. 14 is a cross-sectional view taken along the lines 14—14 of FIG. 11.

As best shown in FIG. 15, the distribution channel 100 is in fluid communication with a pair of axial distribution channels 102. As illustrated, the axial distribution channels 102 are preferably disposed symmetrically around the center die member 58 and extend therealong toward the extrusion end 76'. In the preferred embodiment, each axial distribution channel 102 is in fluid communication with a branch distribution channel 104. As best shown in FIG. 14, the branch distribution channels 104 extend around the center die member 58 in a generally semi-circumferential manner. The channels 104 are in fluid communication with four (4) axial distribution channels 106.

Figure 13:
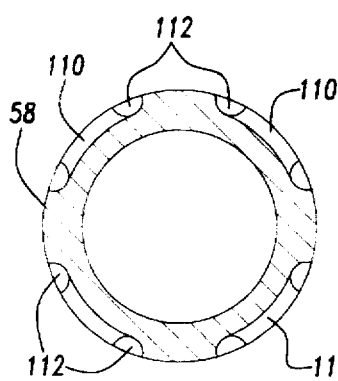
FIG. 13 is a cross-sectional view taken along the lines 13—13 of FIG. 11.

With continuing reference to FIG. 11, the axial distribution channels 106 extend along the center die member 58 toward the extrusion end 76'. The channels 106 are in fluid communication with a plurality of branch distribution channels 110, which extend around the center die member 58 in a partial circumferential manner, as best shown in FIG. 13. In the preferred embodiment, the distribution channels 110 are in fluid communication with eight (8) axial distribution channels 112 (only four of which are specifically illustrated in FIG. 11), which also extend along the member 58 toward the extrusion end 76'. As shown in FIG. 11, the axial distribution channels 112 are in fluid communication with a plurality of generally screw-shaped channels 114 disposed around the extrusion end 76' in a spiral manner.

In operation, extrusion material enters the inlet 72 and travels to the center die member 58. At semi-circumferential distribution channel 100, the extrusion material splits and enters the axial distribution channels 102. The material travels along the channels 102 and splits again at the branch distribution channels 104. The extrusion material then enters the axial distribution channels 106 and travels therealong to the branch distribution channels 110, where the material splits again and enters the eight axial distribution channels 112. From the distribution channels 112, the extrusion material enters the screw-shaped channels 114. As with the inner die member, these screw-shaped channels 114 therefore function to provide even distribution and good uniformity of the extrusion material during the extrusion process.

As shown in FIGS. 4 and 5, extrusion material enters the outer die member 60 through the inlet 74. Referring now to FIGS. 16 through 20, there are shown various cross-sections of the outer die member 60. The inlet 74 preferably extends to a trough 120, which is connected to a generally semi-circumferential distribution channel 122, through which extrusion material is passed for distribution to the extrusion end 76", as described in greater detail herein below.

Figure 16:
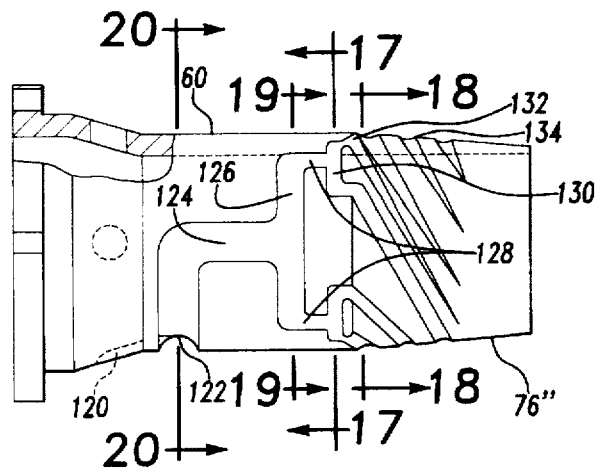
FIG. 16 is a cross-sectional view of the outer extrusion die which is a portion of the coextrusion multi-inlet die of FIG. 4.

With combined reference to FIG. 16 and FIG. 20, the distribution channel 122 is preferably in fluid communication with a pair of axial distribution channels 124 (only one of which is shown in FIG. 16). As illustrated, the axial distribution channels 124 are preferably disposed symmetrically around the outer die member 60 and extend therealong toward the extrusion end 76". In the preferred embodiment, each axial distribution channel 124 is in fluid communication with a branch distribution channel 126. As best shown in FIG. 19, the branch distribution channels 126 extend around the outer die member 60 in a generally semi-circumferential manner. The branch distribution channels 126 are in fluid communication with four (4) axial distribution channels 128.

With continuing reference to FIG. 16, the axial distribution channels 128 extend along the outer die member 60 toward the extrusion end 76". The channels 128 are in fluid communication with a plurality of branch distribution channels 130, which extend around the outer die member 60 in a partial circumferential manner, as best shown in FIG. 18. In the preferred embodiment, the distribution channels 130 are in fluid communication with eight (8) axial distribution channels 132 (only four of which are specifically illustrated in FIG. 16), which also extend along the die member 60 toward the extrusion end 76". As shown in FIG. 16, the axial distribution channels 132 are in fluid communication with a plurality of generally screw-shaped channels 134 disposed around the extrusion end 76" in a spiral manner.

In operation, extrusion material enters the inlet 74 and travels to the trough 120 of the outer die member 60. At semi-circumferential distribution channel 122, the extrusion material splits and enters the axial distribution channels 124. The material travels along the channels 124 and splits again at the branch distribution channels 126. The extrusion material then enters the axial distribution channels 128 and travels therealong to the branch distribution channels 130, where the material splits again and enters the eight axial distribution channels 132. From the distribution channels 132, the extrusion material enters the screw-shaped channels 134. As with the inner and center die members, these screw-shaped channels 134 therefore function to provide good distribution and uniformity of the extrusion material during the extrusion process.

FIG. 21 is a cross-section of the cross-head die 36 schematically shown in FIG. 3. Extruder 34 having auger 138 passes material into inlet 140 of the die housing 142 which is held together by four axial screws 144 and vertical screws 146. The fluoropolymer tube 148 moves in axial fashion through the die housing 142 so that the thermosetting elastomer material can be extruded around it resulting in the composite tube 150 exiting from the housing. The thermosetting elastomer material passes through inlet 140 and moves around channel 152. The desired final outer diameter of the thermosetting elastomer material is controlled by the die 154. The housing is heated by elements 156.

The fuel line or pipe of the present invention is designed to carry hydrocarbon fuels that are generally used in vehicles such as automobiles, trucks, airplanes, locomotives, and the like. The fuel is generally heavy in hydrocarbon materials such as propane, butane and aromatics, such as benzene, toluene and other combustible organic materials. The combined laminate or composite therefore prevents the escape of fuel vapors from the fuel line. Other fuels such as alcohol-based fuels may also be carried in the fuel pipe of the present invention. Further, other hydrocarbon-based fluids such as hydraulic fluids may likewise be utilized in conjunction with the pipe of the present invention. Finally, the properties of the pipe of this invention make it an excellent choice for general chemical handling.

It is to be appreciated that by using the multiple extrusion stages at different positions in the manufacturing process, one can efficiently combine a fluoropolymer that has a high melt extrusion temperature with a thermosetting elastomer or thermoplastic elastomer material which typically have substantially lower extrusion temperatures. By melt extruding the fluoropolymer layer(s) first and then cooling down the formed pipe by running the formed tube through room temperature water, one can thereafter use a separate and distinctly different thermosetting or thermoplastic elastomer to extrude onto the pipe and avoid thermal degradation.

EXAMPLE 1

The surface energy of various treated fluoropolymers was tested. When a dyne solution is placed on a material surface and wets out, that indicates that the material has a higher surface energy than the dyne solution. If the drop "beads up," the material has a lower surface energy than the dyne solution. The use of the dyne solutions is a technique for determining the surface energy of materials. Various samples were prepared of fluoropolymer substrates. Each of the substrates were subjected to a dyne solution identified as ethyl Cello-Solve-Formamide (Trademark of Corotec of Connecticut, U.S.A.). The sample plaques were wiped clean with a dry cloth to remove surface contamination. Solvent was not used to avoid any surface effects from the residue. The dyne solution was applied in a single side-stroke of the brush to leave a ¾ inch by 1 inch patch of solution. Measurements were taken on both treated and untreated samples. The values recorded represent solution which held in a continuous film for greater than 2 seconds. Treated samples were prepared by sweeping the discharge head of the Enercon-Dyne-A-Mite device. Treated samples were prepared by sweeping the discharge head across the plaque at a rate of ¼ inch to ½ inch away from the sample surface. Two passes were made to ensure complete coverage. Listed below are the test results for the samples tested.

| Sample | Initial (E$_S$ - Surf. Energy) | After Treatment (E$_S$ - Surf. Energy) |
| --- | --- | --- |
| KYNAR 740[1] | 42,41,42 | 44,45,44 |
| HYLAR 460[2] | 45,46,45 | 64,58,60 |
| HALAR 500[3] | 34,35,34 | 40,37,39 |
| TEFZEL 200[4] | L30,L30,L30 | 34,34,33 |

[1] KYNAR 740 is a trademark of Atochem of North America for PVDF.
[2] HYLAR 460 is a trademark of Ausimont of Morristown, New Jersey for PVDF.
[3] HYLAR 500 is a trademark of Ausimont of Morristown, New Jersey for ECTFE.
[4] TEFZEL 200 is a trademark of DuPont of Wilmington, Delaware for ETFE.

The results indicate that there is a change in surface energy which indicates that the Enercon mixed gas plasma discharge device activates the fluorinated samples, and that they may be satisfactory substrates for extrusion of a thermosetting or thermoplastic elastomer through the formation of chemical bonds between the layers.

1 KYNAR 740 is a trademark of Atochem of North America VDF.
2 HYLAR 460 is a trademark of Ausimont of Morristown, N.J. for PVDF.
3 HALAR 500 is a trademark of Ausimont of Morristown, N.J. for ECTFE.
4 TEFZEL 200 is a trademark of DuPont of Wilmington, Del. are for ETFE.

EXAMPLE 2

Two 4"×4"×0.010" sheets of extruded ETFE (DuPont Tefzel® 200) were labeled as sample A and sample B. A slab of uncured ethylene/acrylic elastomer (DuPont VAMAC®) was placed over sample A and the two materials were clamped together for curing. Sample B was exposed for approximately 5 seconds to a charged gaseous atmosphere as previously described and then combined with a VAMAC® layer and clamped as with sample A. Both samples were placed in a circulating air oven at 180° C. for 30 minutes to cure the thermosetting layer. Samples were then removed and allowed to cool at room temperature for 30 minutes. Samples were removed from clamps and cut into strips using an ASTM ⅛"×6" die and Arbor press. Six strips from each sample were tested for lap shear strength by separating the layers at the ends of the strip, leaving a 30 mm section of joined material at the center. Each layer of the strip was attached to an opposing tensile machine fixture and the sample was pulled apart at a rate of 50.8 mm/min. Maximum load obtained during the test was recorded. As can be seen from the results, a greater than 500% increase in bond strength over the unexposed samples was achieved by exposure of the substrate to the charged gaseous atmosphere. Actual bond strength of exposed samples is assumed to be greater than reported as all 6 strips failed by tensile failure of the ETFE layer, rather than by separation at the interface.

| Sample | Average Maximum Load (Newtons) | Standard Deviation |
| --- | --- | --- |
| Sample A No exposure | 4.5 N | 0.8 |
| Sample B Exposed to charged gaseous atmosphere | 28.5 N | 5 |

While the forms of the invention herein described constitute presently preferred embodiments, many other are possible. It is not intended herein to mention all the possible equivalent forms or ramifications of the invention. It is understood that the terms used herein are merely descriptive rather than limiting and that various changes may be made without departing from the spirit or scope of the invention. For example, the invention is equally applicable to a fuel filler neck tube or to fluoropolymer/thermosetting elastomer composites in general.

What is claimed is:

1. A method of preparing a tube comprising the steps of:
   continuously extruding a first tubular layer of a thermoplastic fluoropolymer from a first extrusion station, wherein said layer is a substrate having an outer surface and an inner surface;
   providing a plasma treatment station, said station being operative to create a plasma from ambient air at atmospheric pressure;
   using said station to create the plasma from ambient air at atmospheric pressure;
   continuously advancing said fluoropolymer substrate along a first portion of an extrusion line and through said plasma treatment station so that the entirety of the outer surface of said fluoropolymer substrate is contacted by said plasma so that said outer surface is chemically activated;
   continuously advancing said chemically activated substrate along a second portion of said extrusion line to a second extrusion station; and
   continuously extruding a second tubular layer of a nonfluorine-containing polymer selected from the group consisting of thermosetting polymers and thermoplastic elastomers onto said chemically activated substrate so as to form chemical bonds between the layers without an intervening adhesive layer.

2. The method of claim 1 wherein said thermosetting polymer is a thermosetting elastomer.

3. The method of claim 2 and further comprising the step of adding a curing agent to said thermosetting elastomer prior to said step of extruding onto said fluoropolymer substrate.

4. The method of claim 2 wherein said fluoropolymer substrate is an integral multi-layer tube wherein an inner layer comprises a conductive fluoropolymer and an outer layer is a non-conductive fluoropolymer.

5. The method of claim 1 and further comprising the step of applying heat to said layered product after said step of extruding said second tubular layer.

6. The method of claim 1 and further comprising the step of applying pressure to said layered product after said step of extruding said second tubular layer.

7. The method of claim 1 and further comprising the step of moving said fluoropolymer substrate through said plasma at a rate of 1 to 50 linear feet/minute.

8. The method of claim 1 wherein said plasma treatment is operating at 250 to 600 joules per second.

9. A method of preparing a multi-layered tube comprising the steps of:
   forming an inner tubular layer of a fluoropolymer substrate having an outer surface and an inner surface;
   chemically activating said outer surface of said fluoropolymer substrate by subjecting said surface to a charged, substantially non-inert gaseous atmosphere by electrically ionizing a gas which contacts said surface; and
   chemically bonding without an intervening adhesive layer an outer tubular layer of a polymer selected from the group consisting of amide urethane elastomers, chlorinated polyethylene, chlorosulfonated polyethylene, copolyether ester, epichlorohydrin, ethylene acrylic, fluoroelastomer, perfluoroelastomer, fluorosilicone, hydrogenated nitrile butyl, nitrile, polyacrylate, polyester urethane, polyether urethane, polysulfide, polyurethane, silicone, styrene butadiene, styrenic elastomer, ethylene/acrylic elastomer, and thermoplastic elastomers by applying said polymer to the chemically activated fluoropolymer substrate so as to form chemical bonds between the layers.

10. A method of preparing a tube comprising the steps of:

continuously extruding a first tubular layer of a thermoplastic fluoropolymer from a first extrusion station, wherein said layer is a substrate having an outer surface and an inner surface;

providing a plasma treatment station, said station being operative to create a plasma from ambient air at atmospheric pressure;

using said station to create the plasma from ambient air at atmospheric pressure;

continuously advancing said fluoropolymer substrate along a first portion of an extrusion line and through said plasma treatment station so that the entirety of the outer surface of said fluoropolymer substrate is contacted by said plasma so that said outer surface is chemically activated;

continuously advancing said chemically activated substrate along a second portion of said extrusion line to a second extrusion station; and continuously extruding a second tubular layer of a non-fluorine-containing polymer selected from the group consisting of amide urethane elastomers, chlorinated polyethylene, chlorosulfonated polyethylene, copolyether ester, epichlorohydrin, ethylene acrylic, fluoroelastomer, perfluoroelastomer, fluorosilicone, hydrogenated nitrile butyl, nitrile, polyacrylate, polyester urethane, polyether urethane, polysulfide, polyurethane, silicone, styrene butadiene, styrenic elastomer, ethylene/acrylic elastomer, and thermoplastic elastomers onto said chemically activated substrate so as to form chemical bonds between the layers without an intervening adhesive layer.

\* \* \* \* \*

UNITED STATES PATENT AND TRADEMARK OFFICE
Certificate

Patent No. 5,759,329                                    Patented: June 2, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Edward Krause, Ann Arbor, Mich., and Kenneth J. Kuenzel, Grass Lake, Mich.

Signed and Sealed this Twenty-Second Day of December, 1998.

MICHAEL BALL
*Supervisory Patent Examiner*
Art Unit 1733